United States Patent
Kawakami et al.

[11] Patent Number: 5,369,436
[45] Date of Patent: Nov. 29, 1994

[54] AUTOMATIC FOCUSING APPARATUS FOR AUTOMATICALLY MATCHING FOCUS IN RESPONSE TO VIDEO SIGNAL BASED ON EXTRACTED HIGH FREQUENCY COMPONENT OF NON-LINEAR PROCESSED LUMINANCE SIGNAL

[75] Inventors: Kiyotada Kawakami; Masao Takuma, both of Osaka; Tooru Asaeda, Nara; Tooru Yamamoto; Haruhiko Murata, both of Osaka, all of Japan

[73] Assignee: Sanyo Electric Co., Ltd., Osaka, Japan

[21] Appl. No.: 11,527

[22] Filed: Jan. 29, 1993

[30] Foreign Application Priority Data

Jan. 31, 1992 [JP] Japan .................. 4-016227

[51] Int. Cl.$^5$ .................. H04N 5/232; H04N 5/202
[52] U.S. Cl. .................. 348/355; 348/254; 348/349; 348/356
[58] Field of Search .................. 358/227, 164, 32; 354/402, 404; 348/222, 254, 345, 348, 349, 354, 355, 356; H04N 5/232, 5/20, 5/202, 5/225, 5/235

[56] References Cited

U.S. PATENT DOCUMENTS

| | | | |
|---|---|---|---|
| 4,414,575 | 11/1983 | Yamamoto et al. | 358/225 |
| 4,470,676 | 9/1984 | Kinoshita et al. | 358/227 X |
| 4,814,889 | 3/1989 | Covey | 358/227 |
| 4,853,789 | 8/1989 | Murashima et al. | 358/227 |
| 4,887,125 | 12/1989 | Hideshima | 354/402 |
| 4,922,346 | 5/1990 | Hidaka et al. | 358/227 |
| 4,967,280 | 10/1990 | Takuma et al. | 358/227 |
| 4,969,045 | 11/1990 | Haruki et al. | 358/164 |
| 5,003,339 | 3/1991 | Kikuchi et al. | 354/402 |
| 5,077,613 | 12/1991 | Hirao et al. | 358/227 |
| 5,079,622 | 1/1992 | Toshinobu | 358/164 X |

FOREIGN PATENT DOCUMENTS

| | | | |
|---|---|---|---|
| 0297587A2 | 1/1989 | European Pat. Off. | H04N 5/232 |
| 0200071 | 8/1990 | Japan | H04N 5/232 |
| 0219370 | 8/1990 | Japan | H04N 5/202 |
| 0220567 | 9/1990 | Japan | H04N 5/202 |
| 0162076 | 7/1991 | Japan | H04N 5/232 |
| 0175883 | 7/1991 | Japan | H04N 5/232 |

*Primary Examiner*—Mark R. Powell
*Assistant Examiner*—John W. Miller
*Attorney, Agent, or Firm*—Peter L. Michaelson

[57] ABSTRACT

The present invention relates to an automatic focusing apparatus which permits an automatic focusing operation to occur with a high accuracy irrespective of the luminance of an object being sensed. The automatic focusing apparatus includes a focus lens, an image sensor, a focus motor for changing the position of the focus lens, a Y/C separating circuit for separating a luminance signal Y from the output of the image sensor, a non-linear circuit for subjecting the separated luminance signal Y to a non-linear processing, a high pass filter (HPE) extracting a high frequency component from the output of the non-linear circuit, an integrating circuit for integrating the extracted high frequency component and an in-focus detecting circuit for controlling the position of the focus lens based on the result of integration.

6 Claims, 5 Drawing Sheets

AUTOMATIC FOCUSING APPARATUS FOR AUTOMATICALLY MATCHING FOCUS IN RESPONSE TO VIDEO SIGNAL BASED ON EXTRACTED HIGH FREQUENCY COMPONENT OF NON-LINEAR PROCESSED LUMINANCE SIGNAL

BACKGROUND OF THE INVENTION

1. Field of the Invention

The present invention relates generally to automatic focusing apparatuses, and more specifically, to an automatic focusing apparatus for automatically matching the focus to an object in response to a video signal obtained from an image sensor, in an image sensing apparatus such as a video camera having an automatic focusing function.

2. Description of the Background Art

Conventionally, in an automatic focusing apparatus for use in an image sensing apparatus such as a video camera, an approach utilizing a video signal obtained from an image sensor itself for evaluation of the state of focus control has been developed. Such an approach is essentially free from parallax and possesses excellent characteristics such as, for example, the focus can exactly be matched even if the depth of field is small and an object is located in the distance. Furthermore, according to this approach, a special sensor for automatic focusing does not need to be separately provided, and therefore the apparatus is of a very simple.

As one example of such a focus control method utilizing a video signal, a so-called hill climbing servo system has been conventionally known. An automatic focusing apparatus utilizing the hill-climbing servo system is disclosed, for example, in U.S. Pat. Nos. 4,922,346 and 5,003,339, and briefly stated, a high frequency component of a video signal obtained from an image sensor is detected for every field as a focus evaluating value, the detected focus evaluating value is always compared with a focus evaluating value detected one field before, and the position of a focusing lens continues to be slightly vibrated so that the focus evaluating value always takes the maximum value.

The level of a video signal obtained from the image sensor is generally set below 50% of the dynamic range of the image sensor, so that the video signal level is not saturated in the high luminance portion of an object.

For example, in the case of video cameras for consumer use, generally, a CCD output signal level is so set that a video (luminance) signal having a level of 100IRE is obtained when light enters with a luminance corresponding to ⅓ of the dynamic range of the CCD, i.e. the image sensor (about 1/6 for image sensing apparatuses for business use).

More specifically, when an output of the CCD is subjected to a 10-bit A/D conversion, the range (dynamic range) which the digital output of the CCD can take is from 0 to 1023, and the value taken by a digital video signal having a luminance level of 100IRE in this case is about 340. The average value of the luminance levels of a video signal in an image sensing stage is in the range of approximately 60–70IRE, and therefore the value taken by the digital video signal in this case is in the range of approximately 200–250.

As described above, since the level of an a video (luminance) signal is set low in a conventional image sensing apparatus, a high frequency component level extracted for an automatic focusing operation is also low, thereby lowering the accuracy of a focusing operation.

More specifically stated, especially when an object with a low luminance is being sensed, the contrast of the object is generally small, and therefore a high frequency component level extracted for a hill-climbing control is also low. Accordingly, a detected focus evaluation value is decreased, thereby lowering the accuracy of detection for the maximum value. This makes it difficult to find the in-focus position with a high accuracy, resulting in an erroneous autofocusing operation.

Meanwhile, even when a usual object having a relatively high luminance is sensed, as described above, the range of a digitized luminance signal only corresponds to about ⅓ of the entire dynamic range of the CCD, a high frequency component level extracted for a hill-climbing control does not take a sufficiently large value. Therefore, even when an object with usual brightness is sensed, the accuracy of the focusing operation is not necessarily high, and an erroneous operation can be caused in an automatic focusing operation.

SUMMARY OF THE INVENTION

It is an object of the invention to provide an automatic focusing apparatus which allows an automatic focusing operation to always occur with a high accuracy irrespective of the luminance of a sensed object.

In brief, the present invention is directed to an automatic focusing apparatus which performs an automatic matching of the focus to an object in response to a video signal obtained from an image sensing device having a focus lens and an image sensor, and the apparatus includes a relative position changing device for changing the relative position of the focus lens to the image sensor in the direction of optical axis, a non-linear processing circuit for independently subjecting the video signal obtained from the image sensing device to a non-linear processing, a high-pass filter for extracting a high frequency component of the video signal subjected to the non-linear processing by the non-linear processing circuit, a focus evaluation value detecting circuit for detecting the level of the extracted high frequency component, converting the detected level to a focus evaluating value which takes the maximum value at the in-focus position for every fixed period and sequentially supplying the focus evaluating value, and a control circuit for controlling the relative position changing device to move the relative position of the focus lens to a position at which the focus evaluating value is maximized.

In an automatic focusing apparatus in accordance with the invention, since a video signal is independently subjected to a non-linear processing for an automatic focusing operation, an automatic focusing operation can always be performed with a high accuracy irrespective of luminance of an object and without affecting a usual signal processing for the video signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
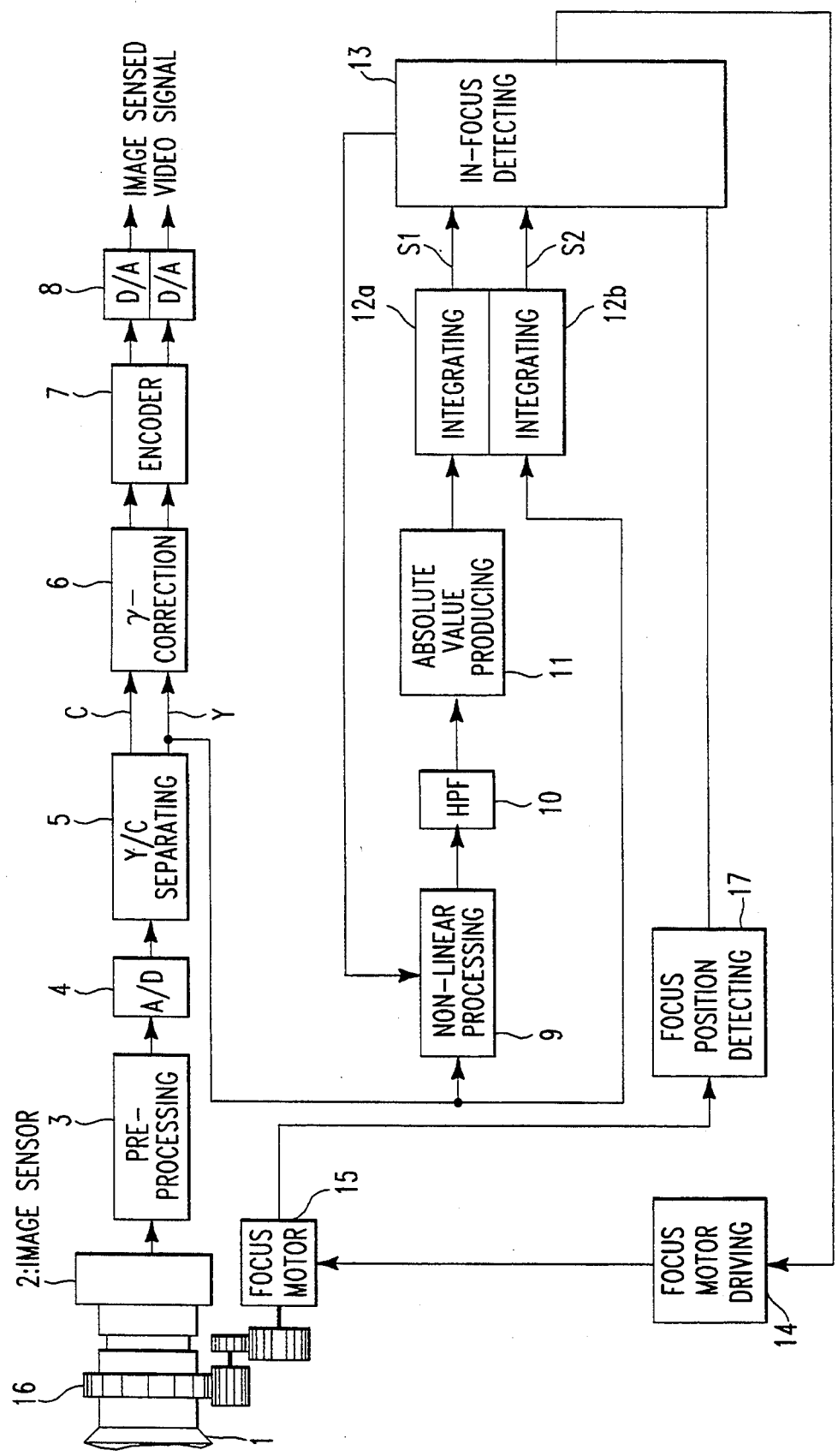
FIG. 1 is a block diagram schematically showing a video camera equipped with an automatic focusing apparatus in accordance with an embodiment of the invention.

FIG. 1 is a block diagram schematically showing a video camera equipped with an automatic focusing apparatus in accordance with one embodiment of the invention. In FIG. 1, the video camera includes a focus lens 1, a focus ring 16 for advancing/withdrawing lens 1, a focus motor 15 for driving focus ring 16, and an image sensor 2 such as a CCD. Advancing/withdrawing of focus lens 1 may be performed using a piezoelectric element instead of focus motor 15, and image sensor 2 itself may be advanced/withdrawn instead of focus lens 1.

An image formed by focus lens 1 on the image sensing plane of image sensor 2 is subject to a photoelectric conversion by image sensor 2, and applied to a pre-processing circuit 3 as a video signal. Pre-processing circuit 3 subjects the applied video signal to a prescribed processing such as reduction of noise, gain adjustment and supplies the resultant signal to an A/D converter 4.

The video signal digitized by A/D converter 4 is separated into a chrominance signal C and a luminance signal Y by a Y/C separating circuit 5, and further supplied to a gamma circuit 6. Gamma circuit 6 subjects the applied signal to a prescribed processing such as gamma correction and supplies the resultant signal to an encoder 7. Encoder 7 converts the supplied chrominance signal C and luminance signal Y into video signals in accordance with a prescribed television system, and then supplies the resultant signals to D/A converters 8. The chrominance signal C and luminance signal Y converted into analog signals by D/A converters 8 are supplied as analog image sensed video signals, and recorded on a magnetic recording medium (not shown) or externally output.

Meanwhile, the luminance signal Y output from Y/C separating circuit 5 is applied to a non-linear circuit 9 as well. The structure and operation of non-linear circuit 9 will later be described in detail. The luminance signal Y subjected to a non-linear processing by non-linear circuit 9 is supplied to a high-pass filter (HPF) 10, and the high-pass filter 10 extracts a high frequency component of the luminance signal Y.

Having a positive value and a negative value, the output of HPF 10 is supplied to an absolute value producing circuit 11 so that its absolute value is produced. For example, assuming that the output of HPF 10 is expressed by the complement of 2, if the most significant bit (sign bit) of the output of HPF 10 is 0, in other words input data applied to absolute value producing circuit 11 is a positive number, absolute value producing circuit 11 outputs the input data as it is, and if the most significant bit is 1, in other words the input data is a negative number, absolute value producing circuit 11 inverts the bits of the input data and adds 1 to the inverted value for output. At that time, if an error is tolerated, the addition of 1 may be omitted.

The output of absolute value producing circuit 11 is provided to an integrating circuit 12a, then integrating circuit 12a integrates for every field period the portion corresponding to a specified region on a picture plane among the high frequency component whose absolute value is produced as described above and outputs the result of integration S1. The integration result S1 is applied to an in-focus detecting circuit 13 as a focus evaluating value. Integrating circuit 12a will later be described in detail.

In-focus detecting circuit 13 is for the above-stated hill-climbing control, and generates a control signal in response to the focus evaluating value S1 output from both integrating circuit 12a and the position of rotation of focus motor 15, detected by a motor position detecting circuit 17, and supplies the generated control signal to a focus motor driving circuit 14. Thus, the rotation of focus motor 15 is so controlled that the relative position of focus lens 1 is moved to the position at which the focus evaluating value S1 is maximized. Such hill-climbing servo control is well known as described above, and therefore further detailed description is omitted.

The luminance signal Y output from Y/C separating circuit 5 is directly supplied to the other integrating circuit 12b. Integrating circuit 12b integrates the portion corresponding to the above-stated specified region of the applied luminance signal Y for every field period, and outputs the result of integration S2. The integration result S2 is applied to in-focus detecting circuit 13 as a brightness evaluation value. In-focus detecting circuit 13 applies a control signal to non-linear circuit 9 in response to the brightness evaluation value, in other words in response to the brightness of the object in the specified region on the picture plane, thereby changing the input-output characteristic of non-linear circuit 9.

Figure 2A:
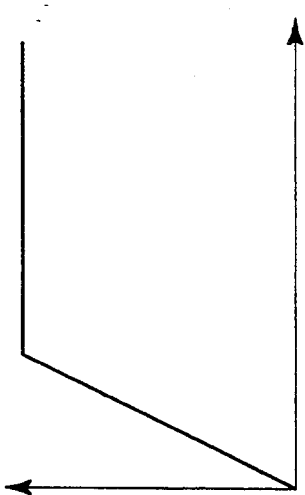
FIGS. 2(Aa)-2(e) are representation showing various examples of the input-output characteristic of a non-linear circuit shown in FIG. 1.

FIGS. 2(a)-(e) are graphic representations showing various examples of a manner of change in the input-output characteristic of non-linear circuit 9. Referring to FIGS. 2(a)-(e), when a very bright object (of a high luminance) is sensed, the input-output characteristic of non-linear circuit 9 is switched to an input-output characteristic as illustrated in FIG. 2(a), in response to a control signal from in-focus detecting circuit 13. More specifically, as to an object with a high luminance, since the level of luminance signal Y is considered to be present up to a very high level, in such a case, the input-output characteristic with no output saturation as illustrated at FIG. 2(a) is employed in order to avoid the saturation of the luminance signal level.

Figure 2B:
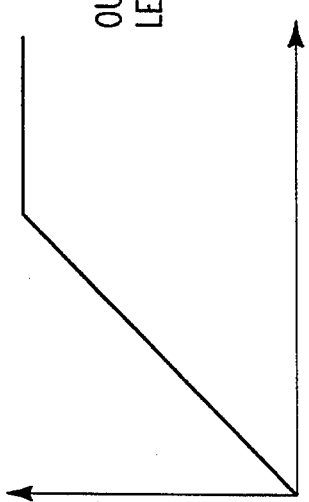
Figure 2C:
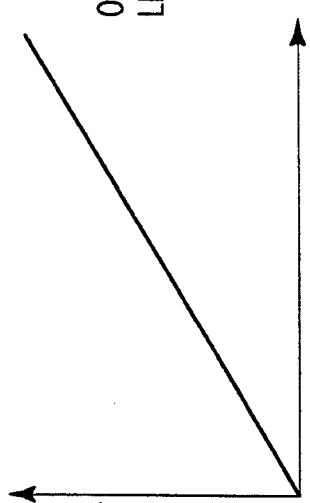
Figure 2E:
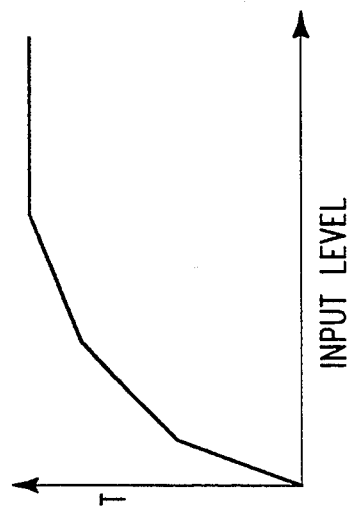
Figure 2D:
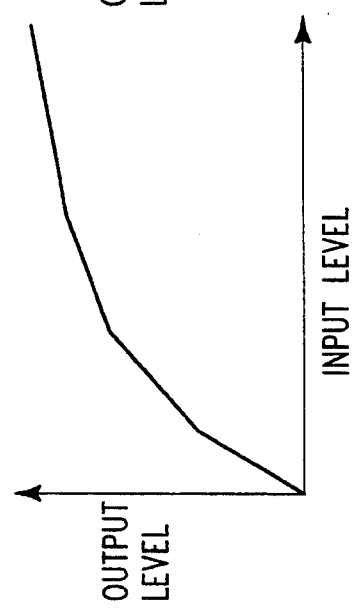

Meanwhile, when an image of an object with usual brightness is sensed, the input-output characteristic of non-linear circuit 9 is switched to an input-output characteristic as illustrated in FIGS. 2(b) or 2(d), in response to a control signal from in-focus detecting circuit 13. More specifically, in this case, the level of the luminance signal Y is within the range about ⅓ the dynamic range of image sensor 2 (see FIG.1), and therefore the input-output characteristic at FIG. 2(b) or FIG. 2(d) is employed so that the output level of non-linear circuit 9 as a whole is increased by increasing the gain of non-linear circuit 9 when the luminance level is low and by reducing the gain when the luminance level is high.

Furthermore, when an image of a dark object (with a low luminance) is sensed, the input-output characteristic of non-linear circuit 9 is switched to an input-output characteristic as illustrated in FIGS. 2(c) or 2(e), in response to a control signal from in-focus detecting circuit 13. More specifically, in this case, the output level of non-linear circuit 9 as a whole is increased by further increasing the gain of non-linear circuit 9 when the luminance level is low.

Figure 3:
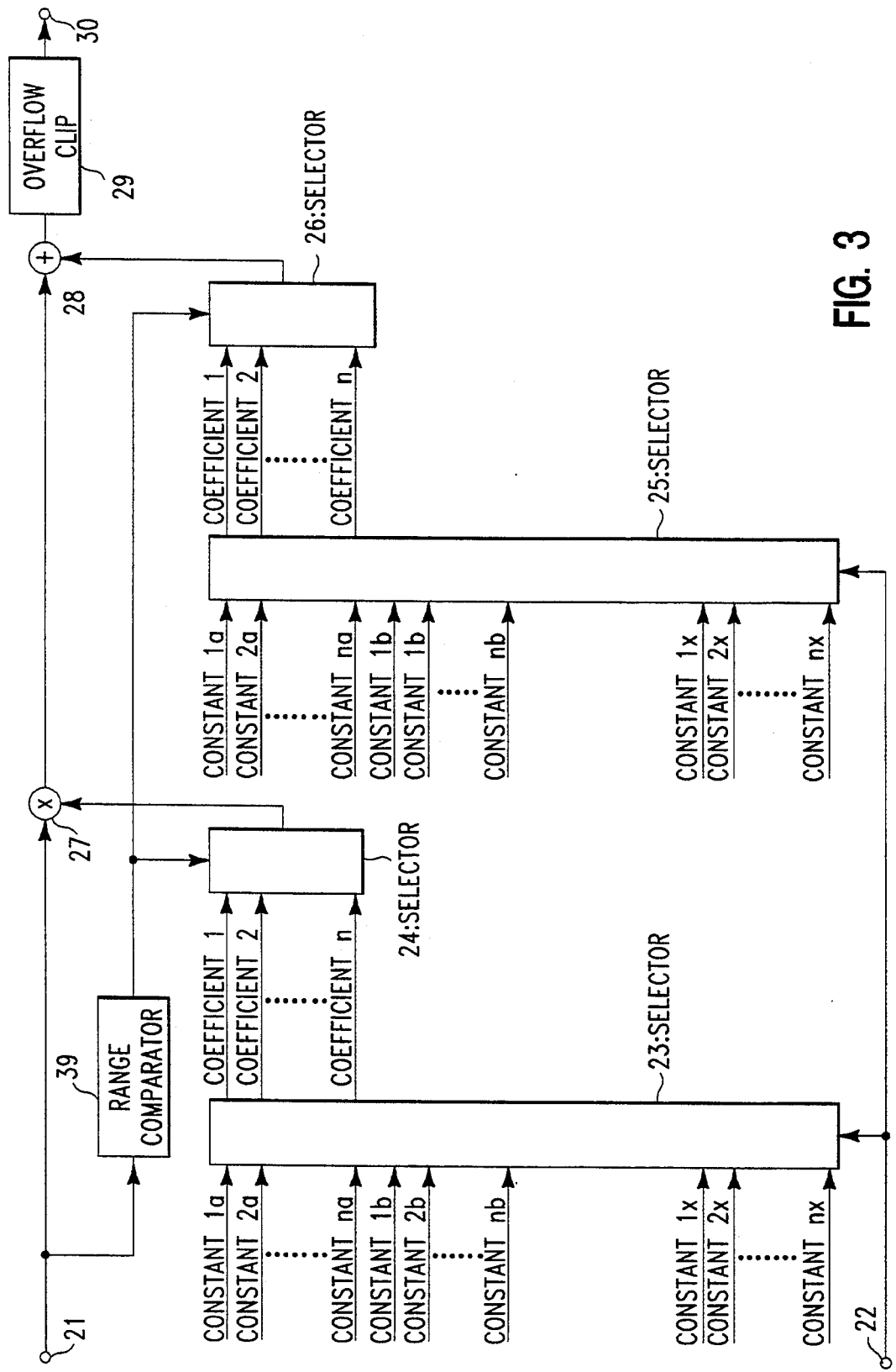
FIG. 3 is a block diagram showing one example of the non-linear circuit shown in FIG. 1.

FIG. 3 is a block diagram showing one example of non-linear circuit 9, depicted in FIG. 1 having a variable input-output characteristic as illustrated in FIGS. 2(a)-2(e). In FIG. 3, a selector 23 selects one set of a plurality of sets of constant values (1a, 2a . . . na), (1b, 2b, . . . , nb), . . . , (1x, 2x, . . . , nx) in response to a control signal supplied from in-focus detecting circuit 13 in FIG. 1 through a terminal 22, and applies the selected one as a combination of n coefficient values to selector 24.

Meanwhile, a selector 25 selects one set of a plurality of sets of constant values (1a, 2a, . . . , na), (1b, 2b . . . nb), . . . , (1x, 2x, . . . , nx) in response to a control signal responding to the brightness evaluation value, supplied from in-focus detecting circuit 13 through terminal 22 and applies the selected one as a combination of n coefficient values to selector 26.

The luminance signal Y input through a terminal 21 from Y/C separating circuit 5 shown in FIG. 1 is applied to one input of a multiplier 27 and to a range comparator 39 as well. Range comparator 22 generates a selection signal in response to the luminance level value and applies the generated signal to the selection inputs of selectors 24 and 26.

Selector 24 selects one coefficient value in response to the selection signal and applies the selected one to the other input of multiplier 27. The result of the multiplication is further applied to one input of an adder 28. Selector 26 selects one coefficient value as an offset value in response to the above-stated selection signal and applies the selected one to the other input of adder 28.

The result of addition is output from a terminal 30 through an overflow clip circuit 29. Thus, the input luminance signal is multiplied by a certain coefficient and added with a certain offset value in response to the luminance level, and therefore a non-linear input-output characteristic of n folded lines as illustrated in FIGS. 2(a)-2(e) will be obtained.

Figure 4:
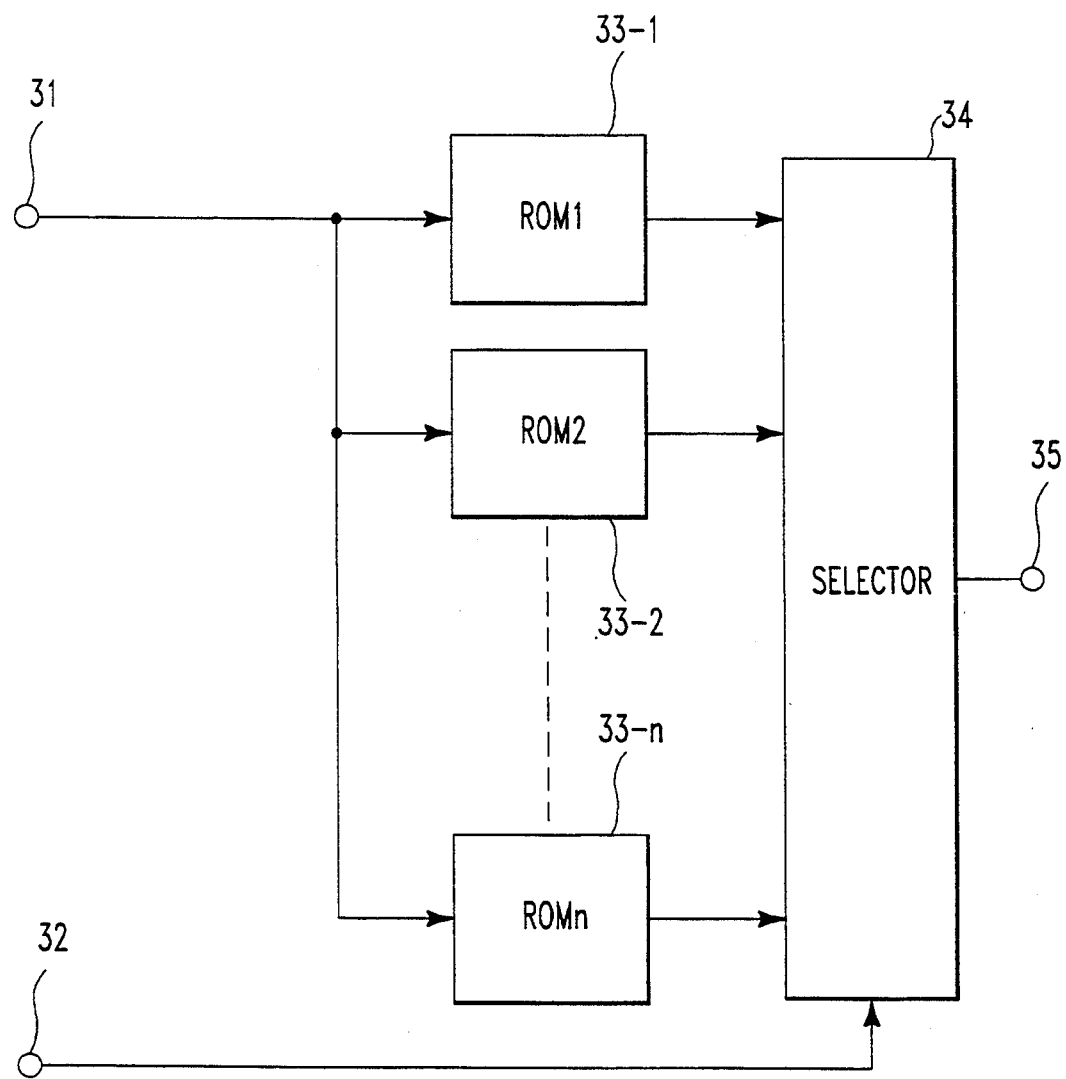
FIG. 4 is a block diagram showing another example of the non-linear circuit shown in FIG. 1.

FIG. 4 is a block diagram showing an example of another structure of non-linear circuit 9 depicted in FIG. 1. Non-linear circuit 9 shown in FIG. 4 includes a plurality of ROMs 33-1, 33-2, . . . , 33-n written with respective different input-output characteristic data, and a non-linear output is read out from each ROM and applied to selector 34, using as address the luminance signal level Y input from Y/C separating circuit 5 shown in FIG. 1 through an input terminal 31. Selector 34 selects one ROM output in response to a control signal, responding to the brightness evaluation value, input from in-focus detecting circuit 13 shown in FIG. 1 through a terminal 32 and supplies the selected one from a terminal 35 as a non-linear output.

Figure 5:
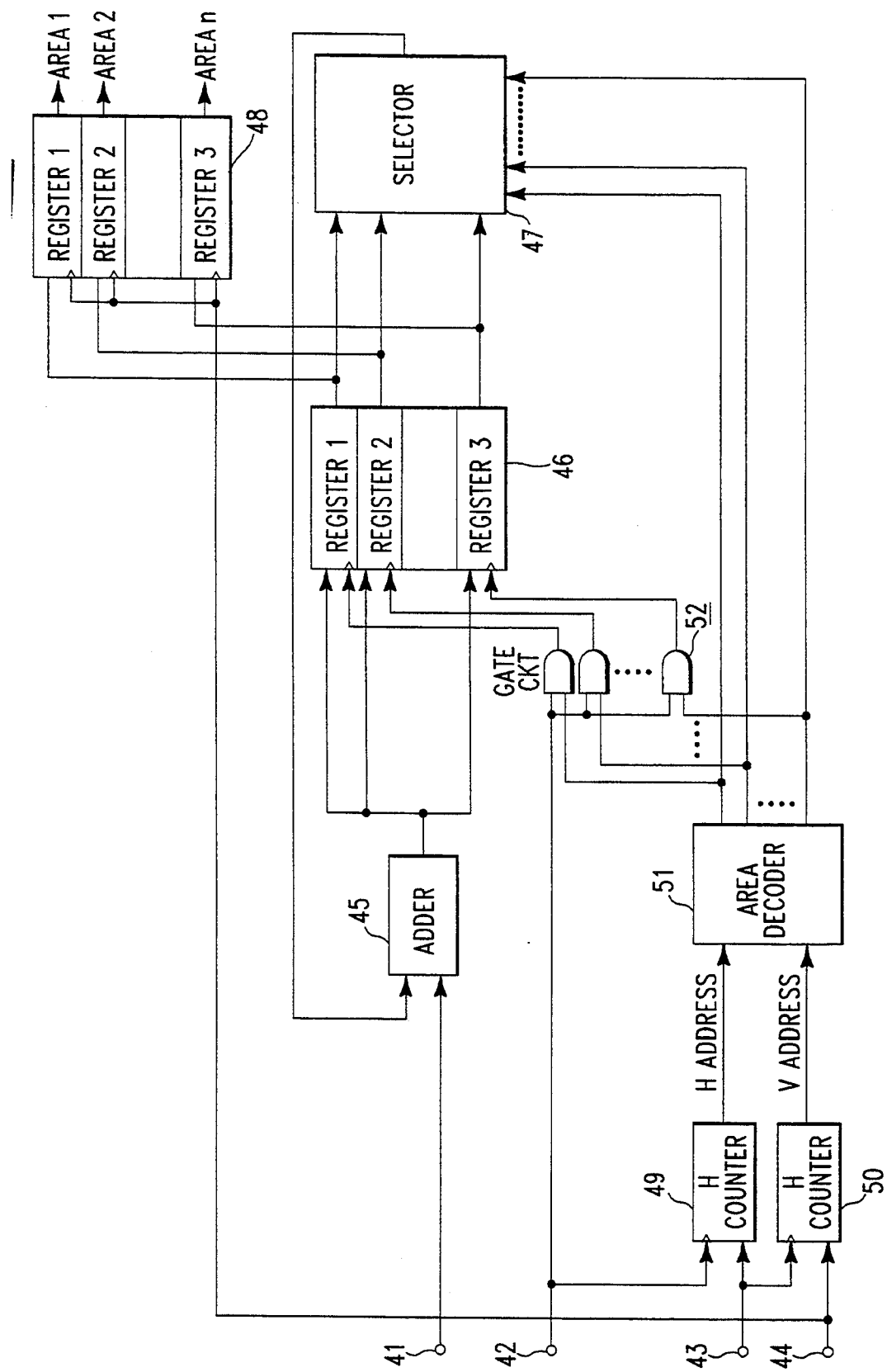
FIG. 5 is a block diagram showing one example of a integrating circuit shown in FIG. 1.

FIG. 5 is a block diagram showing an example of integrating circuit 12a or 12b shown in FIG. 1. It is noted that in the example illustrated in FIG. 5, a plurality of evaluation values are obtained from a plurality of regions set on a picture plane. In FIG. 5, a horizontal counter 49 counts a system clock signal supplied from a signal source which is not shown through a terminal 42 and is reset in response to a horizontal synchronizing signal supplied from a signal source which is not shown through a terminal 43. The output of horizontal counter 49 is applied to an area decoder 51 as a horizontal address.

Meanwhile, a vertical counter 50 counts the above-stated horizontal synchronizing signal, and is reset in response to a vertical synchronizing signal supplied from a signal source which is not shown through a terminal 44. The output of vertical counter 50 is applied to area decoder 51 as a vertical address. Area decoder 51 outputs a plurality of area signals which do not overlap each other in response to these horizontal and vertical addresses, and applies the plurality of area signals to the respective one inputs of a plurality of AND gates constituting a gate circuit 52 and to the selection input of a selector 47 as a selection signal.

Meanwhile, data input through terminal 41 is applied to one input of an adder 45, and the output of adder 45 is applied in parallel to a register circuit 46 formed of n registers provided correspondingly to the regions on the picture plane. Selector 47 selects one of the outputs of the n registers in response to an area signal from the above-stated area decoder 51 and applies the selected one to the other input of adder 45. Adder 45, register circuit 46, and selector 47 constitute integrating circuit 12a or 12b shown in FIG. 1.

A system clock signal input through terminal 42 is applied commonly to the respective other inputs of the plurality of AND gates constituting gate circuit 52. Therefore, the integrating circuit integrates input data for every area utilizing a register corresponding to each area designated in response to an area signal output from area decoder 51.

Thus, input data is integrated for one field period for every area, then held at a register circuit 48 formed of the n registers using a vertical synchronizing signal supplied from terminal 44 as a clock input, and then supplied to in-focus detecting circuit 13 as evaluating values for the respective areas.

In the above described embodiment, the luminance signal Y output from Y/C separating circuit 5 is applied to non-linear circuit 9 to be subjected to the non-linear processing. However, the similar effects can be obtained by applying the video signal before Y/C separation to non-linear circuit 9 for the non-linear processing instead of the luminance signal Y output from Y/C separating circuit 5.

As described in the foregoing, since the automatic focusing apparatus according to the invention includes a non-linear processing circuit for independently subjecting a video signal obtained from the image sensor to a non-linear processing, an automatic focusing operation with a high accuracy can always be performed irrespective of the luminance of an object and without affecting a usual processing for a video signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing apparatus for automatically matching focus to an object in response to a video signal obtained from image-sensing means, said image-sensing means having a focus lens and an image sensor with a common optical axis therebetween, said apparatus comprising:

relative position changing means for changing the relative position of said focus lens with respect to said image sensor and along a direction of the optical axis;

non-linear processing means, response to a luminance signal contained in said video signal, for generating a processed signal which varies as a pre-defined non-linear function of said luminance signal;

high-pass filtering means for extracting a high frequency component of the processed signal so as to form an extracted high frequency component;

means for detecting a level of said extracted high frequency component for every field period of said video signal and converting the level to a focus evaluating value which reaches a maximum value at an in-focus state; and control means, responsive to said detecting and converting means, for controlling said relative position changing means so as to move the relative position of said focus lens to a position at which said focus evaluating value is maximized.

2. An automatic focusing apparatus in accordance with claim 1, further comprising:

means, responsive to said luminance signal, for detecting a luminance level within a pre-defined portion of an image sensed by said image-sensing means, and wherein said non-linear processing means has an input-output characteristic, which produces a pre-defined output value in response to a pre-defined input value, and comprises means for changing the characteristic in response to said detected luminance level, a value of said luminance signal being applied as the input value and a corresponding value of the processed signal being produced as the output value.

3. An automatic focusing apparatus in accordance with claim 2 wherein:

the characteristic changing means varies the characteristic from a substantially linear form to an increasingly non-linear form as the detected luminance level varies from a relatively high first value to a relatively low second value, wherein a gain component of said characteristic varies in response to both the detected luminance level and the value of the luminance signal such that the gain increases or decreases as the detected luminance level decreases or increases, respectively, with an amount of the increase or decrease in the gain being determined by the value of the luminance signal.

4. An automatic focusing apparatus in accordance with claim 3, wherein said non-linear processing means comprises:

first selection means for selecting one set of a plurality of sets of constant values in response to the detected luminance level;

second selection means, responsive to said luminance signal, for selecting one constant value from the selected one set of constant values; and means for generating a value of the processed signal through a pre-determined function of said luminance signal and the selected one constant value.

5. An automatic focusing apparatus in accordance with claim 3, wherein said non-linear processing means comprises:

a plurality of storage means, each one of said storage means stores output data values for a different input-output characteristic, wherein said luminance signal is applied an address to each one of said storage means in order to collectively read corresponding output data values from all of said storage means so as to form a plurality of output data values; and means, responsive to said detected luminance level and connected to all of said storage means, for selecting one value from the plurality of output data values as a value of the processed signal.

6. An automatic focusing apparatus in accordance with claim 2, wherein said luminance level detecting means comprises:

means for separating the luminance signal from said video signal; and means for integrating the luminance signal, wherein said integrating means comprises:

means for defining a plurality of regions on an image plane sensed by said image sensor; and means for separately integrating said luminance signal, for each of said plurality of regions and over a field period so as to yield the detected luminance level for each one of said regions.

* * * * *